Nov. 2, 1954

G. R. PURIFOY ET AL 2,693,562

DYNAMIC-BRAKING CONTROL

Filed Feb. 4, 1952

INVENTORS
George R. Purifoy and
Robert E. Burkhart.
BY
O.B.Buchanan
ATTORNEY

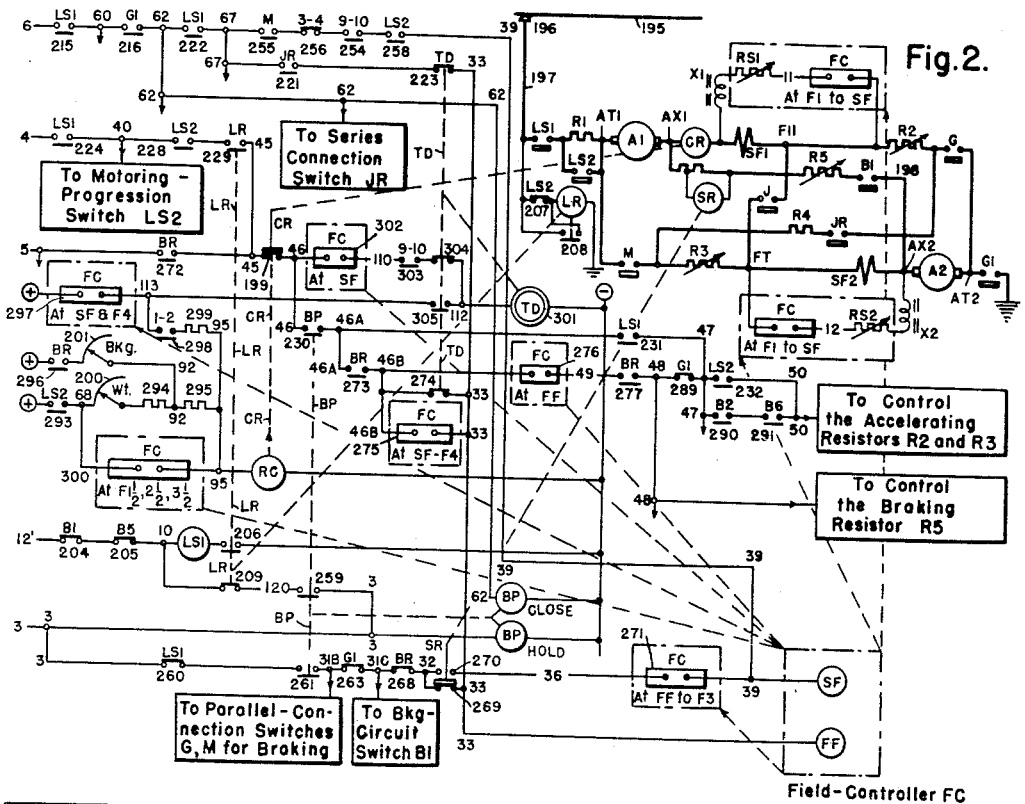

United States Patent Office 2,693,562
Patented Nov. 2, 1954

2,693,562

DYNAMIC-BRAKING CONTROL

George R. Purifoy and Robert E. Burkhart, Pittsburgh, Pa., assignors to Westinghouse Electric Corporation, East Pittsburgh, Pa., a corporation of Pennsylvania Application February 4, 1952, Serial No. 269,752

24 Claims. (Cl. 318—251)

Our invention relates to direct-current electrically propelled railway-vehicles, and it has particular relation to electrical control-systems therefor, in which provision is made for dynamic braking. Our invention is an improvement over the type of control which is shown in the Riley and Purifoy Patent 2,523,143, granted September 19, 1950; an application of Lynn G. Riley, Serial No. 95,904, filed May 28, 1949; and an application of John E. Drake, Serial No. 258,712, filed November 28, 1951.

Proper control of the buildup of dynamic braking depends upon the previous continuous circulation of a weak braking-current in the dynamic-braking circuit during coasting, before braking is applied. This current during coasting is called spotting current. On rapid-transit cars to which our present invention is applicable, difficulties have been experienced, with the equipment as originally supplied (before our present improvements), because of a severe surge when the brake is applied after coasting. The over-shooting of the braking-current is, in turn, caused by the previous system of spotting-control, which permitted some of the resistance-shorting switches to close, in the course of spotting-current adjustment during the coasting period, thus reducing the amount of resistance which is initially included in the braking circuit at the moment when braking is first applied. The over-shooting of the braking current occurs primarily during high-speed operation, at which time the flux-buildup in the motors causes excessive motor-voltage and current to build up soon after the application of dynamic braking. Excessive motor-current and voltage, during the buildup of dynamic braking, results in rough braking and in motor-flashing.

Our present invention is an improvement in, or a carrying-forward of the idea of, an invention of William L. Barclay, in which the spotting-current adjustment is taken care of altogether by field-strength control of the motor or motors, while maintaining the maximum value of resistance in the braking-circuit or circuits. Then, when dynamic braking is called for, after a coasting-period, the steps of first progressively increasing the field-excitation to full field, and then progressively cutting out the braking-circuit resistance, as may be required, ordinarily introduces sufficient slowness of progression to avoid a rough dynamic-braking application, and also to avoid motor-flashing, as set forth in a copending Barclay Patent 2,637,008, granted April 28, 1953, on an application, Serial No. 275,187, filed March 6, 1952.

Sometimes, however, during an extended operating-period, the car or train gains a considerable speed. Under such conditions, during coasting, the motor or motors are operating on short-field, and the braking-circuit or circuits for the spotting-current have their maximum value of braking-circuit resistance. If, now, dynamic braking is called for, the ordinary procedure has been to first progressively increase the motor field-strength toward its full-field value, under the control of the braking-current limit-relay means; that is, to increase the field-strength whenever, or as long as, the current in the braking-circuit is below a predetermined desirable braking-current value. In the dynamic-braking circuit or circuits, however, the motors are operating as self-excited series generators, and such machines are notorious for their sluggish buildup of field-strength or motor-flux. Consequently, at very high speeds, the field-circuit control-means, under the control of the braking-current limit-relay means, gets adjusted towards a condition corresponding to too much field-strength in the motors, before the actual motor-flux has had time to build up to the corresponding value. The result is an over-shooting, in the buildup of dynamic-braking current, resulting in rough braking and in motor-flashing.

In accordance with one feature of our present invention, we avoid such rough braking-applications, during high-speed operation, by providing a means which will respond to the high-speed conditions, and thereupon introduce a suitable time-delaying means, which will prevent the field-circuit adjustments from progressing all the way to full-field conditions, until the expiration of a delay which is sufficient for a partial buildup of the braking-current at the predetermined field-controlling condition at which the field-controlling progression has been arrested. A delay of two or three seconds, after the initial partial buildup of the field-strength circuit-conditions, will suffice to give the motors time to build up the required flux-values, meanwhile steadily building up the braking-current, and then it is safe to permit the resumption of the braking-control progression, resulting in a smooth braking-application, and no flashing of the motors.

In a preferred form of embodiment of our invention, the means for responding to excessive speed-conditions, for setting our time-delaying means into operation (or into readiness for operation), takes the form of a recalibrated adjustment of the same limit-relay which is used to control the acceleration-progression of the traction-motor or motors. Thus, at the final short-field adjustment which is obtained at the end of the acceleration-progression, the limit-relay, which had been controlling the acceleration-progression, is recalibrated to a considerably lower current-value so that it will thereafter respond only to low-current conditions corresponding to the attainment of a predeterminedly high motor-speed. Then, with the field-controlling means still in the short-field position, when the limit-relay again makes a low-current response, it will set into operation the time-delaying circuits and mechanisms of our present invention.

During the accelerating period, in previous railway-control systems to which our invention is applicable, the shunt-field operating-conditions are obtained, for example, at a speed of about 18 miles per hour. Serious difficulty is encountered, in the way of rough braking and motor-flashing, only if dynamic braking is attempted when the car or train is operating, for example, at a speed of 42 miles per hour, or over. According to our invention, therefore, the limit-relay recalibration is adjusted to make the limit-relay have its recalibrated low-current response if the car or train reaches a speed of 42 miles per hour while power is being applied to its traction-motors.

A further feature of our invention has to do with insuring against an unwanted low-current response of this acceleration-controlling limit-relay, after passing a third-rail gap, at which time the former practice has been to deenergize the power-circuit of the traction-motors, and to automatically rapidly run through the acceleration-progression again, as soon as third-rail or trolley-power is again available. Under such conditions, due to the relative operating-times of the affected switches and relays, it is desirable that the acceleration-controlling limit-relay shall be already in its non-responsive or acceptable-current condition at the instant when the field-controlling means reaches its shunt-field position. Thus, if the car or train speed is anywhere between 18 and 42 miles per hour, noninclusive, while the motor-flux is decaying toward the steady-state value corresponding to the short-field circuit-adjustment, any unusually low motor-current which may occur during these transient flux-adjustment conditions will not produce an unwanted excessive-speed response. To this end, we provide means for giving the acceleration-controlling limit-relay a boost in excitation at some intermediate time during the progression of the field-controlling means from its full-field condition to its short-field condition, as will be subsequently described.

A further feature of our invention, as embodied in the apparatus which is illustrated herein, relates to a means for insuring that the trainman has dynamic-brake (if he wants it), in the event of the loss of third-rail or trolley power-supply while the main accelerating-controller is in an operating position. In previous railway-control systems, to which our present invention is applicable, it has been necessary to provide a brake-power relay, which is a protective relay which is energized whenever a power-circuit energization is applied to the traction-motor or motors, said relay being thereafter held, in its energized position, when the main accelerating-controller is returned to its off-position, as set forth in the copending Riley application. This protective relay is used for the purpose of making sure that a dynamic-braking circuit is not established, except immediately after a power-circuit operation of the motor or motors. In accordance with one feature of our present invention, an extra or alternative "hold" circuit is provided for this protective relay, which is energized whenever a no-voltage power-circuit condition occurs while the main accelerating-controller is on any one of its "on" positions.

With the foregoing and other objects in view, our invention consists in the circuits, systems, apparatus, combinations, parts, and methods of design and operation, hereinafter described and claimed, and illustrated in the accompanying drawing, wherein:

Fig. 2 is a fragmentary schematic, or across-the-line diagram, of the novel features of our present invention, and enough of the other equipment to show the setting of the invention and the operation of its essential or generic features; and Fig. 3 is a sequence-chart.

Figure 1:
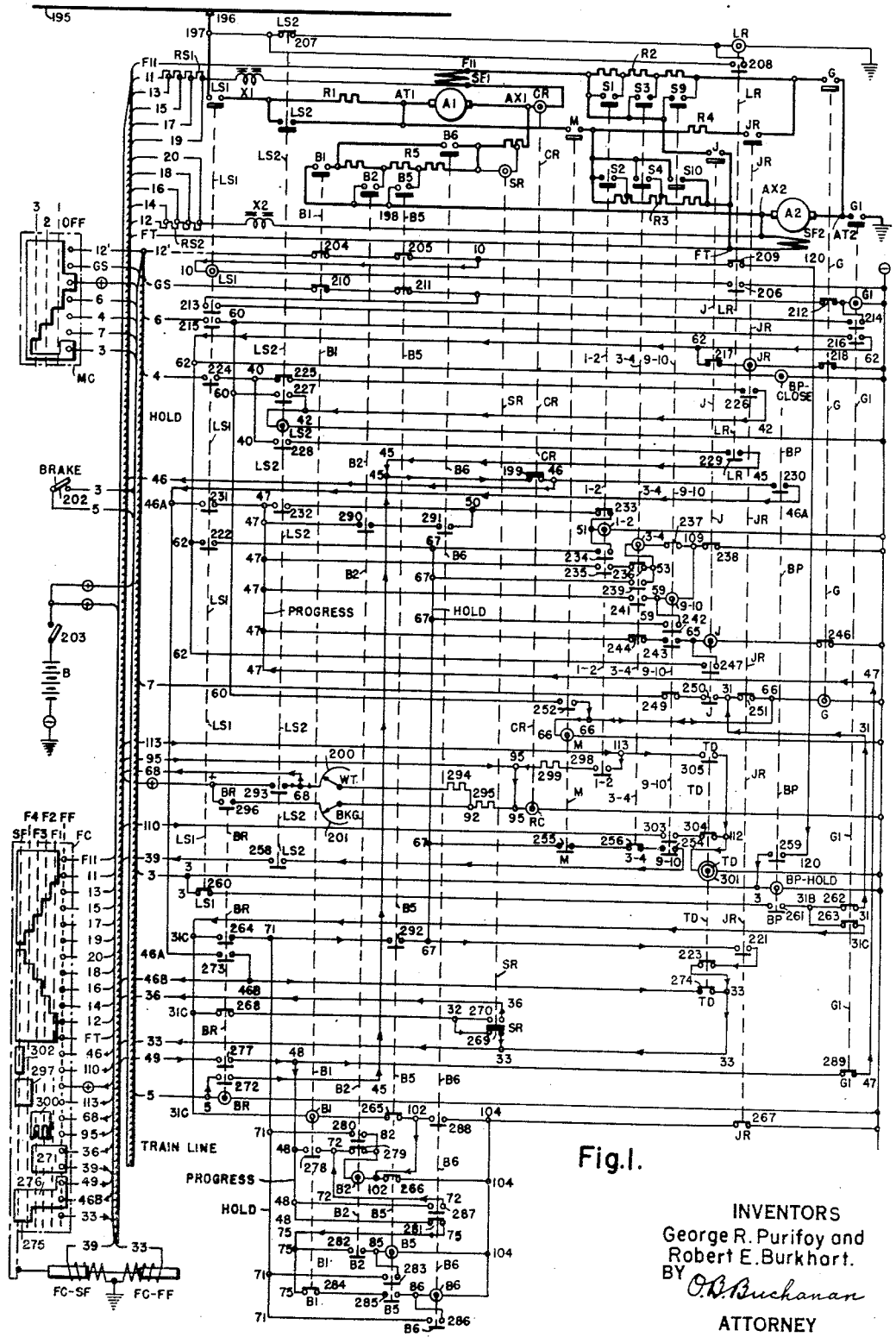
Figure 1 is a simplified circuit-diagram of the parts of one car, which are necessary to illustrate our present invention, omitting many parts which are known to be needed in a successful railway-control equipment of the type to which our invention is applied, but which are not necessary to be discussed in setting forth the nature and operation of our present improvements.

Fig. 1 represents some of the equipment which is carried by a single electrically-propelled railway-car embodying our invention. Direct-current power is supplied to the car from a third rail 195, or a trolley wire, which is engaged by a third-rail shoe 196, or a trolley pole, pantograph, or other current-collecting equipment, carried by the car. The third-rail shoe 196 energizes a line 197 which constitutes a supply-circuit for the car. The traction-motors for the car are series motors, which are indicated, by way of a simple example, in Fig. 1, as comprising two motor-armatures A1 and A2, each being associated with its own series field winding SF1 and SF2, respectively; the ordinary reversing-switches being omitted for the sake of simplicity. Two series-motor means, or circuits, are shown. The first series-motor means comprises, in series, an armature-terminal AT1, a motor-armature or armatures A1, an intermediate connection-point AX1, a series field winding or windings SF1, for supplying the field-excitation for said armature or armatures, and a field-terminal F11. The corresponding parts for the second series-motor means are indicated at AT2, A2, AX2, SF2, and FT.

A series-parallel motor-control arrangement is shown in Fig. 1, in which a line-switch or relay LS1 and a ground-switch G1 are used as power-switch means for establishing a power-circuit for energizing the motors, by connecting the first armature-terminal AT1 to the supply-circuit 197, and connecting the second armature-terminal AT2 to ground. For completing the series-circuit connections, a switch JR is closed in addition to the power-switches LS1 and G1. For parallel-motor operation, two switches M and G are closed in addition to the power-switches LS1 and G1. The parallel-motor switch M provides a circuit-connection between the armature-terminal AT1 of one series-motor means and the field-terminal FT of the other series-motor means; while the other parallel-motor switch G provides a circuit-connection between the other armature-terminal AT2 and the other field-terminal F11. During an intermediate transition-period, a switch J is closed. These motor-controlling connections are all in accordance with a well-known switching-system.

Dynamic-braking circuits are established by opening the two power-switches LS1 and G1 and closing a braking-switch B1 in addition to the two parallel-connection switches M and G, also in accordance with a well-known system or arrangement. The braking-switch B1 provides a common dynamic-braking circuit-connection 198 between the respective intermediate connection-points AX1 and AX2 of the two series-motor means, thus providing two dynamic-braking circuits wherein the motor-armature or armatures of each of said series-motor means are loaded by the field winding or windings of the other one of said series-motor means, respectively.

A suitable number of series-connected accelerating resistance are used, as indicated at R1, R2, R3 and R4. The resistance R1 is disposed between the supply-line 197 and the first armature-terminal AT1, and is shorted out by means of a second line-switch LS2. The resistance R2 is in series with the first field-terminal F11, and is progressively shorted out by means of switch-contacts S1, S3 and S9. The resistance R3 is in series with the second field-terminal FT, and is progressively shorted out by switch-contacts S2, S4 and S10. The resistance R4 is in the series-motor connection which is made by the switch JR, and this resistance is finally shorted out by the transition-switch J, for obtaining the full-series power-circuit connection of the motors. During parallel motor operation, the switch-contacts S3, S4 and S9, S10 are successively or progressively closed, during the acceleration of the motor, and after all of the accelerating-resistances R2 and R3 have been cut out, the field-strengths of the motors are progressively reduced, to provide short-field operating-conditions.

In accordance with a usual arrangement, the motor-fields are reduced by equipping each of the series field windings SF1 and SF2 with a field-shunt, comprising an inductive reactor X1 or X2, as the case may be, and a variable resistor RS1 and RS2, respectively. The field-shunts X1—RS1 and X2—RS2 are first connected in parallel relation to their respective field-windings SF1 and SF2, by means of contact-terminals 11 and 12 respectively of a progressively or sequentially operating field-controlling means, which is herein illustrated as an electrically operated drum-type field-controller FC. After the respective field-shunts have been connected into operation, the field-shunt resistances RS1 and RS2 are then progressively shorted out by successive controller-points 13, 15, 17 and 19, for RS1, and 14, 16, 18 and 20, for RS2, as the field-controller FC is moved from its initial full-field position FF, through its intermediate positions F1, F2, F3 and F4 to its short-field position SF, at which point the field-winding currents are reduced to about fifty per cent of their unshunted values.

During dynamic braking, the two motors are connected by the common dynamic-braking circuit-connection 198, which contains the braking-switch B1 and a braking-resistance R5. This resistance R5 is used, in addition to the previously mentioned accelerating-resistances R2 and R3, in establishing the complete dynamic-braking circuit. The braking-resistance R5 is progressively shorted out by means of braking-switches B2, B5 and B6, during dynamic-braking operations, after which the acceleration resistances R2 and R3, or portions thereof, are progressively shorted out, as by the switch-contacts S3, S4, and S9, S10. (The switch contacts S1 and S2 are permanently closed during the dynamic-braking operations, in the illustrated system.)

The progressive operation of the various resistance-shorting switches, during both motoring operation and dynamic braking, is under the automatic control of a suitable limit-relay or relays, which are energized to be responsive to conditions which accompany excessive torque in the motors. Such a limit-relay is illustrated in the form of a current-relay CR, having an actuating-coil CR which is connected in series-circuit relation between the intermediate connection-point AX1 and the series field winding SF1. This current-relay CR also has a back-contact 199 (also marked CR), which is normally closed, that is, which is closed in the non-actuated or low-current position of the relay.

The current-relay CR is also provided with certain recalibrating-means. In accordance with previous practice, this relay is provided with a cumulatively operating rate-coil RC, which is energized through a weight-responsive rheostat 200, during accelerating operations, and which is energized through a braking-responsive rheostat 201 during dynamic-braking conditions. The weight-responsive rheostat 200 is automatically adjusted according to the variable weight or live load carried by the car, so that the rate-coil RC is the most strongly excited during light-load conditions, thus reducing the minimum-current setting at which the limit-relay CR picks up and opens its back-contact 199. The braking-responsive rheostat 201 is automatically changed in response to the position of the brake-handle 202, so that the rate-coil RC has its maximum excitation when a low braking-rate is called for, thus providing a low minimum-current setting at which the limit-relay CR picks up and opens its back contact 199.

In accordance with our present invention, the rate-coil RC has two other paths through which it can be energized, one path being through a contact-terminal 113 of the field-controller FC, while the other path is through the contact-terminals 68 and 95 of said field-controller FC, as will be subsequently explained.

All of the electrically controlled relays and switches which are shown in Fig. 1 are diagrammatically indicated as having vertical switch-stems (indicated by dotted lines), which are biased by gravity toward their lowermost positions, and all of these switches and relays are shown, in Fig. 1, in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The various electrical control-circuits for the train are under the control of a number of train-line wires, which extend from car to car, throughout the entire length of the train. In the simplified circuit-diagram of Fig. 1, eight of these train-line wires are indicated, being given their usual designations, namely (+), 3, 4, 5, 6, 7, 12' and GS.

Energy for the various relay-circuits is provided by means of a battery B on each car. The negative terminal (−) of each battery is permanently grounded, while the positive terminal of each battery is connected, through a switch 203 to the positive train-like wire (+).

Each end of each car is provided with a motorman's master controller MC, only one of which is indicated in Fig. 1. The illustrated master controller MC is indicated as being an accelerating-controller having an off-position and three on-positions 1, 2 and 3. In each of the three on-positions of the master-controller, MC, the positive control-wire (+) is connected to the train-line wires 12', GS and 6. The train-line wire 12' is the energizing-wire for the operating-coil LS1 of the line-switch LS1; while the train-line wire GS is the energizing-wire for the operating-coil G1 of the ground-switch G1, as will be subsequently described.

In the second and third on-positions of the accelerating-drum of the master controller MC, the train-line wire 4 is energized from the positive bus (+); while in the third on-position of this controller, the train-line wire 7 is energized from the positive bus (+).

In the off-position of the accelerating drum or master controller MC, a connection is made from the positive control-wire (+) to the train-line wire 3. In the master controller MC, in accordance with a known practice, there is an overlap between the off-position contact which energizes this conductor 3, and the on-position contacts which energize the conductors 12' and GS, so that, during the notching-off of the master-controller MC, the contact at 3 is made before the contacts at 12' and GS are broken. This overlapping construction is particularly necessary in properly controlling a braking-operation protective-relay BP which will be subsequently described, and which also constitutes the subject matter of the previously mentioned Riley application.

The circuits and the operations, under the control of the various control-wires 12', GS, 6, 4, 7, 3 and 5, are best described together, with special emphasis on the novel features of our present invention. Reference may be made to the previously mentioned copending Riley application, and also to the previously mentioned Riley and Purifoy Patent 2,523,143, granted September 19, 1950, for further explanations of previously know features with which our present invention cooperates. Reference may also be had to Fig. 3 of the accompanying drawings which shows the sequence of the switching operations.

The first on-position of the accelerating-controller MC, in Fig. 1, is a switching position, in which the control-wires 12', GS, and 6 are all energized. The control-wire 12' energizes a control-circuit wire 10, through interlocks which are provided, by the braking-switches B1 and B5, in the form of back-contacts 204 and 205, respectively; and the control-circuit wire 10 is used to energize the operating-coil LS1 of the line-switch LS1.

In accordance with a usual practice, the exciting-circuit for the line-switch operating-coil LS1 also contains a make-contact 206 of a line-relay LR, which is a voltage-responsive relay which drops out upon a voltage-failure of the supply-line 197. This line-relay LR is shown as an undervoltage relay which has an operating-coil LR which is connected between the supply-line 197 and ground, through a back-contact 207 of the line-switch LS2, said back-contact 207 being paralleled by a make-contact 208 of the line-relay LR.

In accordance with our invention, the control-wire 10 energizes a control-wire 120 through a back-contact 209 of the line-relay LR. This line-relay back-contact 209 thus closes in the event of a power-line voltage-failure, which might result from either a third-rail gap or from any other cause; and if the master-controller MC is, at the time, on any on-position, the conductors 12' and 10 will be energized, and hence the line-relay back-contact 209 will energize the control-wire 120, which we use as an auxiliary holding-circuit for a protective relay or brake-power relay BP, which we will subsequently describe in more detail.

The train-line wire GS energizes the operating-coil G1 of the ground-switch G1, through interlocks which are provided by back-contacts 210, 211 and 212, which are carried by the braking-switches B1 and B5, and by the parallel-operation switch G, respectively. In accordance with our invention, the back-contact 212 is paralleled by two interlocks in series with each other, namely, a make-contact 213 of the line-switch LS1, and a make-contact 214 of the ground-switch G1.

The train-line wire 6 is connected, through an LS1 make-contact 215, to a relay-circuit 60, which is connected, through a G1 make-contact 216, to a circuit 62 which constitutes a hold-circuit for the switch-progression for the accelerating-resistance short-circuiting switches S1 to S10 and J. This hold-circuit 62 is used to energize the operating coil JR of the series-motor-circuit switch JR through interlocks on the switches J and G, in the form of back-contacts 217 and 218, respectively. The said hold-circuit 62 is also used to directly energize the close-coil or actuating-coil BP-Close of the braking-operation protective-relay BP.

The result of the master-control energizations in the No. 1 on-position of the master-controller MC, is thus to close the main-circuit or power-circuit contacts of the traction-motor switches LS1, G1 and JR, thereby completing a series-connection motor-circuit for causing a slow movements of the train, for so-called "switching" purposes, with all of the accelerating-resistances in series with the motors. This circuit can be traced from the supply-circuit 197, through the main LS1 contact, the resistor R1, the armature A1, the current-relay coil CR, the series field SF1, the resistance R2, the main JR contact, the resistance R4, the resistance R3, the series field SF2, the motor armature A2, and the main G1 contact, to ground.

At the same time, the energization of the braking-operation protective-relay BP paves the way for the subsequent energization of the dynamic-braking circuits of the motors, and also for the automatic progression-control, under the control of the limit-relay or current-relay CR, both for the motoring progression during acceleration, and for the dynamic-braking progression during an application of the brake-lever 202, as will be subsequently described.

The energization of the series-connection switch JR closes a JR make-contact 221 which energizes the full-field wire 33 of the field-controller FC, from a hold-circuit 67, which is connected to the previously described hold-circuit 62 through an LS1 make-contact 222. In accordance with our present invention, this circuit, containing the JR make-contact 221, also contains a back-contact 223 of a time-delay relay TD, which will subsequently be described.

The full-field wire 33 of the field-controller FC energizes a full-field coil FC–FF, or other means for causing the field controller FC to move or progress from its shortfield-position SF to its full-field position FF. This energization of the full-field coil FC–FF in response to an actuation of the series-connection switch JR thus assures that the field-controller FC is in its full-field position FF during the series-connection operation of the traction-motors.

The No. 2 position of the accelerating-controller MC energizes the train-line wire 4, which is connected, through an LS1 make-contact 224, to a conductor 40. The conductor 40 is connected, through an LS2 back-contact 225, and a JR make-contact 226, to a conductor 42, which energizes the operating-coil LS2 of the second line-switch LS2, which short-circuits the first accelerating-resistor R1. This LS2 switch has a make-contact 227 which picks up and serves as a holding-circuit contact between the circuits 60 and 42.

This second line-switch LS2 also has a make-contact 228 which connects the circuit 40 to a circuit 45, through a make-contact 229 which we provide on our line-relay LR. The circuit 45 is connected, through the CR-limit-relay back-contact 199, to a circuit 46, which we use, in accordance with our present invention, in order to obtain a high-speed response, after the limit-relay CR has been suitably recalibrated as will be subsequently described. To this end, we make a connection from the circuit 46 to the field controller FC, so that, when the field controller is at its short-field position SF, it will connect the circuit 46 onto a contact-terminal 110, which we used for the purpose of obtaining a response to a high motor speed, as will subsequently be described.

In accordance with previous practice, the main control-circuit from the conductor 46, after passing through the CR limit-relay contact 199, continues on, through a BP make-contact 230, to a circuit 46A which constitutes the main limit-relay progression-circuit of the control-equipment. This limit-relay progression-circuit 46A is thus not only under the control of the limit-relay or current-relay CR, which is responsive to excessive motor-currents, but it is also under the control of the braking-operation protective-relay BP, which must be closed (with the protective relay in its actuated position), before there can be any progression during either the motoring operation or the braking operation.

This limit-relay progression circuit 46A is connected, through an LS1 make-contact 231, to a progression-wire 47, which is connected through an LS2 make-contact 232 to a control-wire 50. The control-wire 50 energizes the operating-coil 1–2 for a resistor-shorting progression-switch which carries the two main contacts S1 and S2, this energization being effected through a back-contact 233 of this same switch 1–2. Thus, this energizing-circuit from the conductor 50 includes the switch-out interlock 233, a conductor 51, and the coil 1–2. The switch 1–2 picks up and closes a holding-circuit make-contact 234, which energizes the circuit 51 from the hold-circuit 67.

The actuation of the resistance-shorting switch 1–2 also closes a make-contact 235, which energizes a circuit 53 from the progression-circuit 47, through a back-contact 236 of a resistance-shorting switch 3–4, which is the switch which carries the main switching-contacts S3 and S4. The energizing circuit for this switch extends from the conductor 53, through the operating coil 3–4 and a back-contact 237 of a resistance-shorting switch 9–10, thence through a control-circuit conductor 109, and a J-switch back-contact 238, to the grounded negative battery-terminal (—). The actuation of the resistance-shorting switch 3–4 closes a make-contact 239 which establishes a holding-circuit for the conductor 53 from the hold-wire 67.

The actuation of the progression-switch 3–4 also closes a make-contact 241, which completes a circuit from the progression-wire 47 to a conductor 59, which energizes the actuating coil 9–10 of the resistance-shorting switch which carries the main switch-contacts S9 and S10, the negative terminal of said coil 9–10 being connected to the previously described wire 109. The actuation of the switch 9–10 closes a make-contact 242 which establishes a holding-circuit for the conductor 59 from the hold-wire 67.

The actuation of the resistance-shorting switch 9–10 also closes a make-contact 243, which is connected between the progression-wire 47, a back-contact 244 of the resistance-shorting switch 3–4, and a circuit 65, thus energizing the operating-coil J of the transition-switch J, through the G-switch back-contact 246. The transition-switch J then closes its main or power-circuit contact J, which constitutes the last step in the series motor-connection for the traction-motors, cutting out the last accelerating-resistance R4. This transition-switch J has a make-contact 247 which establishes a holding-circuit from the conductor 65 back to the hold-line 62. The previously described J-switch back-contacts 217 and 238 are opened, upon the energization of the transition-switch J, thus dropping out the initial series-connection switch JR, and the accelerating-switches 3–4 and 9–10.

The next step in the acceleration of the traction-motors is accomplished by a movement of the master-controller MC to its No. 3 position, which energizes the train-line wire 7. This train-wire 7 is connected, through a back-contact 249 of the resistance-shorting switch 9–10, and a make-contact 250 of the transition-switch J, so as to energize a control-circuit 31, which is in turn connected, through a JR back-contact 251, to a control-circuit 66 which energizes the operating coils M and G of the parallel-motor-connection switches M and G. These switches M and G thereupon connect the traction-motors in parallel, between the supply-circuit 197 and ground, with only two of the resistance-shorting switches energized, namely the second line-switch LS2, and the switch 1–2 which carries the main switching-contacts S1 and S2. The energization of the parallel-connection switch G opens the previously described back-contact 246, which drops out the transition-switch J. The energization of the parallel-connection switch M closes a make-contact 252, which establishes a holding-circuit for the conductor 66 from the line 60.

Responsive to the dropping-out of the transition-switch J, the back-contact 233 of this switch recloses, and re-initiates the switch-progression of the resistance-shorting contact S3 to S10, under the control of the switches 3–4 and 9–10, through the circuits which have been previously described. This establishes the maximum armature-voltage conditions on the motors, and it completes the connections for the full-field parallel-connection operation of the traction-motors, as indicated also in the sequence-chart of Fig. 3.

As soon as the last resistance-shorting switch 9–10 closes, it closes an additional contact 254, which energizes a field-controller-actuating circuit from the hold-wire 67, said circuit extending from the wire 67 through a make-contact 255 of the parallel-connection switch M, a back-contact 256 of the resistance-shorting switch 3–4, the previously mentioned make-contact 254 of the resistance-shorting switch 9–10, and a make-contact 258 of the line-switch LS2, and thence to the short-field wire 39 of the field-controller FC.

The short-field wire 39 of the field-controller FC energizes the short-field coil FC–SF, or other means which may be used to move the field-controller from its full-field position FF to its short-field position SF. This starts the progressive operation of the field-controller, and it may be brought about in any one of several ways. In the illustrated form of embodiment, since the power for the short-field wire 39 is obtained from the hold-wire 67, which is not under the control of the limit-relay CR, the field weakening progression of the field-controller FC, once it is started, carries through automatically until the short-field position SF is reached, relying upon the time which is normally required for this progression to adequately cushion the field-weakening operation and prevent any undesirable increase in the rate of acceleration of the traction-motor or motors. This completes the connections for the short-field parallel-connection operation of the traction-motors, thus completing the acceleration-progression, as indicated in the sequence-chart of Fig. 3.

If, now, the master-controller MC is returned to its off-position, the car or train being now running at some speed, the master-controller will energize the train-line wire 3, which may be described as the brake-wire 3, because it is used to set up the dynamic-braking circuits for the motors during the coasting operation. When the braking-protective relay BP is used, as shown, the brake-wire 3 is also used to directly energize the hold-coil BP-Hold of the braking-protective relay BP, and this hold-coil may be regarded as representative of any holding-means which is effective only after the protective relay BP has previously been moved to its actuated position. When a separate holding-coil BP-Hold is used as such a holding-means for the BP relay, said coil will be made so as to be too weak to pick up the BP relay if the relay is in its non-actuated position when the hold-coil is energized, but the hold-coil BP-Hold has enough energy to hold the relay actuated or closed, once it has been actuated.

In accordance with our present invention, the BP-Hold coil is also provided with a second energizing-circuit, which is independent of the brake-wire 3, and thus independent of the off-position of the master-controller MC. This second hold-coil energizing-circuit includes a make-contact 259 of this brake-protective relay BP, and this make-contact 259 is used to energize the brake-wire 3 from the previously described control-circuit 120, which is under the control of the line-relay LR, so that the control-circuit 120 is energized whenever there is a failure of the line-voltage, at a time when the train-line wire 12' is energized, that is, at a time when the master-controller is on any one of its three on-positions, as previously described. In this way, we not only maintain the energization of the BP-Hold coil under the no-voltage conditions just described, thus making sure that the brake-protective relay BP remains in its actuated condition, but we also immediately energize the brake-line 3, without waiting for the master-controller MC to be returned to its off-position, thus establishing the coasting braking-circuit connections, as will now be described.

The brake-wire 3 is connected, through an LS1 back-contact 260 and a BP make-contact 261, to a control-circuit 31B. This control-circuit 31B is connected, through a G1 back-contact 262, to the previously described control-circuit wire 31, which energizes the previously described parallel-motoring switches M and G through the JR back-contact 251 and the control-wire 66. The control-conductor 31B is also connected, through a G1 back-contact 263, to a control-wire 31C, and thence, through a make-contact 264 of a brake-relay BR, to a braking-operation hold-wire 71. The control-wire 31C is connected to the positive terminal of the braking-switch coil B1, the negative terminal of which is connected in a circuit which includes a B5 back-contact 265, a conductor 102, another B5 back-contact 266, a conductor 104, and a JR back-contact 267, and thence to the grounded negative battery-terminal (—). The closure of the switches M, G and B1 completes the establishment of a weak coasting-operation dynamic-braking circuit-connection for the traction-motors, with all of the available dynamic-braking resistances R5, R2 and R3 in circuit, this dynamic-braking resistance being large enough so that the braking tractive-effort is usualy quite weak, at moderate motor-speeds, thus permitting the train to coast, with little or no sensible or perceptible braking-effect, as long as the field-controller FC remains in its short-field position.

A connection is also provided, for controlling the field-controller FC during the coasting-operation. Thus, we provide a circuit extending from the control-wire 31C, through a back-contact 268 of the brake-relay BR, to a control-circuit 32, and thence through the back-contact 269 of a spotting-relay SR, to the full-field wire 33 of the field-controller FC. The brake-relay BR was shown and described in the previously mentioned Riley and Purifoy patent, and its energizing-circuit will be referred to hereinafter. The spotting relay SR is a previously used relay, having an operating coil SR which is included in the common brake-circuit connection 198, so that this relay is responsive to the braking-circuit current. This spotting-relay SR is adjusted to have a low-current pickup-value, so that it can hold the braking-circuit current to a small value suitable for spotting purposes, during the coasting operation of the traction-motors, as is well understood in the art.

In accordance with a known control-method, the spotting-relay SR has a make-contact 270 which connects the circuit 32 to a circuit 36, which goes to a field-controller contact-segment 271, which is closed only during certain early points in the progressive movement of the field-controller FC from its full-field position FF toward its short-field position SF. This field-controller segment 271 is preferably opened at a certain point near the short-field position SF, preferably before the field-controller reaches this short-field position SF. As shown, we prefer to have this field-controller segment 271 closed at the positions FF through F3 of the field-controller FC. This field-controller segment 271 is used to connect the wire 36 to the short-field wire 39 of the field-controller FC. In this way, when the spotting current is too large, that is, large enough to pick up the spotting-relay SR, the spotting current is reduced by adjusting the motor-fields toward a weaker condition, by making the field-controller FC progress in the direction towards its short-field position, but this progression is usually arrested before the field-controller returns all of the way back to its original short-field position SF, which it occupies before the spotting-control commenced to operate.

A service braking-application is made by the closure of the brake-lever 202, which energizes the full-brake wire 5 from the brake-wire 3. This full-brake wire 5 is connected directly to the coil BR of the brake-relay BR. This brake-relay BR has a make-contact 272, which connects the full-brake line 5 to the conductor 45 which leads up to the limit-relay progression-circuit 46A, thus putting the braking progression under the control of the back-contact 199 of the limit-relay or current-relay CR, as well as under the control of the BP make-contact 230, both of which are in circuit between the conductor 45 and the limit-relay progression-circuit 46A.

Whenever a braking-application is called for, the energization of the brake-relay BR closes a BR make-contact 273, which is used in the initiation of the dynamic-braking progression. Thus, the BR make-contact 273 is used to make a connection from the limit-relay progression-circuit 46A to a control-wire 46B. From the control-wire 46B, two parallel circuit-paths are connected to the full-field wire 33 of the field-controller FC, one of these parallel paths being from the wire 46B, through a back-contact 274 of the previously mentioned time-delay relay TD, and thence to said full-field wire 33, while the other parallel path is from the wire 46B to a field-controller contact-member 275, which is closed in the last two field-controller positions, F4 and SF, and thence to the full-field wire 33 of the field-controller FC. The effect of the first-mentioned parallel path, that is, the one through the time-delay back-contact 274, is to permit an immediate progression of the field-controller FC until it reaches its full-field position FF, under the control of the limit-relay CR, which controls the energization of the limit-relay progression-circuit 46A. This is the normal course of procedure, at car or train speeds at which our time-delay relay TD is not actuated. The conditions under which the time-delay relay TD is actuated will be subsequently described.

When the braking-controlling progression has proceeded to the point at which full-field conditions are restored in the traction-motors, the field-controller FC closes a full-field contact-member 276, which closes a circuit from the control-wire 46B to a conductor 49, and thence through a BR make-contact 277 to a braking-progression circuit 48.

The energization of the braking-circuit progression-wire 48 immediately serves, through a B1 make-contact 278, which is already closed, to energize a circuit 72, which is connected, through a B2 back-contact 279, to a circuit 82 which is connected to the positive terminal of the B2 actuating-coil, the negative terminal of which is connected to the previously described conductor 102. The B2 switch thus picks up and closes its main contact B2 which shorts out a part of the braking-resistance R5 in the common dynamic-braking circuit 198 of the traction-motors. The actuation of the B2 switch closes a make-contact 280 which establishes a holding-circuit for the wire 82 from the hold-wire 71.

A circuit is next established from the lower end of the progression-wire 48, through a B6 back-contact 281, to a conductor 75, and thence through a B2 make-contact 282, which has just been closed, to a conductor 85 which is connected to the positive terminal of the B5 actuating-coil, the negative terminal of which is connected to the previously mentioned wire 104. The B5 switch closes its main-circuit contact B5, which shorts out more of the braking-resistance R5 in the common dynamic-braking circuit 198 of the traction-motors. At the same time, the B5 switch closes a make-contact 283 which establishes a holding-circuit from the conductor 85 back to the hold-wire 71.

The energization of the braking-progression switch B5 opens its previously mentioned back-contacts 265 and 266, thus dropping out the switches B1 and B2, the main contacts of which are both short-circuited, now, by the main contact B5. The dropping-out of the B1 switch closes its lowermost back-contact 284, which completes a circuit from the conductor 75 to a B5 make-contact 285, and thence to a wire 86, which is connected to the positive terminal of the B6 coil, the negative terminal of which is connected to the wire 104. The B6 switch thus closes, and closes its main contact B6 which further shorts out some of the breaking-resistor R5, thus still further reducing the effective braking-resistance in the dynamic-braking circuits. At the same time, the actuation of the B6 switch closes its make-contact 286, which establishes a holding-circuit for the wire 86 from the wire 71.

The actuation of the B6 switch also closes a make-contact 287, which connects the progression-wire 48 to the previously described conductor 72, thereby reenergizing the B2 switch, the negative circuit of which is now completed from the wire 102, through a B6 make-contact 288, to the wire 104.

It will be understood that all of these braking-progression operations are under the control of the limit-relay progression-circuit 46, which interrupts the progression whenever an excessive motor-current causes an opening of the current-relay back-contact 199, which is connected in the energizing circuit for said wire 46, thus interrupting the progression until the motor-current subsides to a desirable value.

The braking-circuit progression-wire 48 is also connected, through a G1 out-contact or back-contact 289, to the accelerating-resistance progression-wire 47.

After the second closure or actuation of the B2 switch, so that the B2 and B6 switches are now both closed, a circuit is made, from the accelerating-resistance progression-wire 47, through a B2 make-contact 290 and a B6 make-contact 291, to the previously described conductor 50, thus reinitiating the progression of the switches 1—2, 3—4, and 9—10, which progressively cut out the accelerating resistors R2 and R3 which are in the individual portions of the respective dynamic-braking circuits of the traction-motors, this progression being also under the same limit-relay control.

Ever since the actuation of the B5 switch, a B5 make-contact 292 has been energizing the accelerating-resistance hold-circuit 67 from the wire 71, in readiness for this progression of the accelerating-resistor switches S1 to S10. The braking-progression thus continues until substantially all of the braking-resistance is removed from the dynamic-braking circuit, thus resulting in the completion of the dynamic-braking operation, during which the speed of the car or train has been reduced from the initial speed at which the dynamic brake was applied, down to a low speed at which the dynamic brake fades out.

It has long been customary to automatically adjust the calibration or setting of the limit-relay CR, in order to cause this relay to drop out in response to various accurately controlled desirable minimum motor-current values, during both the acceleration-progression and the dynamic-braking progression. This is conveniently done by various controls for the energization of the rate-coil RC of the limit-relay CR. In the drawing, we have shown four circuits for the rate-coil control or calibration. Two of these rate-coil energizing-circuits are known. One such rate-coil circuit involves the weight-responsive rheostat 200, and is traceable from the positive control-power line (+) through an LS2 make-contact 293, a conductor 68, the aforesaid weight-responsive rheostat 200, a resistance 294, a conductor 92, a resistance 295, and the rate-coil wire 95. A second old or known rate-coil energizing-circuit involves the braking-responsive resistance 201, and is traceable from the positive bus (+) through a BR make-contact 296 and the aforesaid braking-responsive rheostat 201 to the conductor 92.

In accordance with our present invention, we provide two novel rate-coil energizing-circuits. One of our novel rate-coil energizing-circuits is for the purpose of re-calibrating the limit-relay CR so that, when short-field conditions have been established, at the end of the acceleration-progression, the said limit-relay CR will not not again drop out until the motor-current has reached such a low value as to indicate the attainment of a predetermined high-speed condition, such as the previously suggested car-speed of 42 miles per hour. Our novel rate-coil energizing-circuit for this purpose is traceable from the positive bus (+) to a field-controller contact 297, which is closed at least when the field-controller FC reaches its shunt-field position SF, this contact being illustrated as being closed at both the position SF and at the next preceding position F4. From the field-controller contact 297, this rate-coil energizing-circuit continues through a conductor 113, a make-contact 298 of the resistance-shorting switch 1—2, (which is closed during the acceleration-progression), and a resistance 299, and then the rate-coil wire 95.

A final rate-coil energizing-circuit, which we have provided, involves a special means, shown in the form of a field-controller segment 300, for a purpose which will be subsequently described. This last-mentioned rate-coil energizing-circuit is traceable from the positive bus (+), through the previously mentioned LS2 make-contact 293, the wire 68, the field-controller segment 300, and the rate-coil wire 95.

As previously mentioned, our present invention also involves a delaying means, which we have shown in the form of a time-delay relay TD. This relay is illustrated in the form of a slugged telephone-type relay, having an operating-coil TD and a short-circuited slug 301 which causes the relay to have a delayed drop-out operation, after it is deenergized. The primary energizing circuit for the TD coil is from the conductor 45 which, as previously explained, is energized both during motoring and braking; said conductor 45 being energized from the motoring-conductor 4 through the LS1 interlock 224, the conductor 40, the LS2 interlock 228, and the LR interlock 229; and said conductor 45 being energized from the braking conductor 5 through the brake-relay contact 272.

From the conductor 45 the initial TD energizing circuit continues through the CR limit-relay contact 199, the circuit 46, a field-controller contact-segment 302 which is closed at the shunt-field position SF of the field-controller FC, and thence through a conductor 110 to a make-contact 303 of the resistance-shorting switch 9—10, and a back-contact 304 of the time-delay relay TD, to a conductor 112 which energizes the operating coil TD of said time-delay relay. As soon as this time-delay relay TD picks up, it closes a make-contact 305 which closes a holding-circuit between the previously mentioned conductor 113 and the TD-energizing conductor 112. At the same time when the energization of the TD relay causes a closure of this make-contact 305, said relay also opens its three previously mentioned back-contacts 223, 274, and 304.

The operation of the simplified illustrated apparatus will be clear from the running comments which have been made during the progress of the description, as well as from the prior art which is represented by the Riley and Purifoy patent and the copending Riley application. A few words of added explanation, as to the features which are more particularly related to our novel relay-circuit parts, may, however, be helpful.

One of the novel features of our present invention relates to the use of a time-delay relay TD. In the broader aspects of our invention, this relay may be considered as being representative of any relay which is operative when the brake-lever 202 is closed at a time when the car or train is traveling above a predetermined high speed, such as 42 miles an hour, said time-delaying means then operating, during braking, to arrest the progression of the field-controller FC before it reaches its full-field position, and to hold said field-controller in its arrested position for a time which is sufficient for a partial buildup of the braking-current. During this time-delay, the actual field-strength or flux in the traction-motors (now operating as series generators) builds up smoothly or gradually, due to the well-known sluggish voltage-buildup characteristic of series generators.

We have shown that, in this manner, we can avoid excessive motor-current and voltage, and thus we can avoid rough brake-applications and motor-flashing, at high car-speeds. When the car-speed is not high, the braking-progression is allowed to proceed in a normal manner, particularly in the manner which is covered by the Barclay application, namely by first causing the field-controller FC to progress to its full-field position, after which the field-controller segment 276 initiates the progressive reduction of the resistance in the braking-circuits.

The particular time-delaying means which we have shown is a slugged telephone-type relay TD in which the time-delay occurs in the dropping-out time of the relay, after its energizing-coil TD has been deenergized. The TD coil is initially energized, subject to three principal conditions, as is evident from the circuit 110 in Fig. 2. These three conditions are as follows: the limit-relay CR must have dropped out and closed its back-contact 199; the field-controller FC must have reached its short-field position SF, wherein it closes its segment 302; and the resistance-shorting switch 9—10 must have closed, closing its make-contact 303, indicating a completion of the progression whereby the accelerating-resistances R2 and R3 are progressively shorted out, during the motoring or power-circuit operating-conditions.

The above-described dropping-out of the limit-relay CR, which we use to set up the conditions for a time-delay period in the subsequent braking operations, is the particular means which we have shown for securing an automatic indication of the fact that a predeterminedly high car-speed has been attained. We get this response by recalibrating the limit-relay CR, through its rate-coil RC, by means of the circuit 113, as shown in Fig. 2. Thus, when the field-controller reaches its last position, in its progress toward the shunt-field position FC, or, as shown, when the field-controller reaches its next-to-last position F4 (or any other intermediate position), the field-controller segment 297 energizes the circuit 113, which increases the excitation of the cumulative rate-coil RC enough so that the limit-relay CR will not drop out until the motor-current falls to a valve which is low enough to indicate the attainment of the desired high speed during the short-field parallel-connection motoring-operation.

When the time-delay relay TD picks up, in response to the attainment of a predeterminedly high car-speed during the motoring-operation, it locks itself in, by means of a holding-circuit through its make-contact 305, and it opens its back-contact 274 in the circuit from the wire 46A through the braking-relay make-contact 273 to the wire 46B, the aforesaid TD back-contact 274 and the full-field wire 33 of the field-controller FC. In this way, when the TD back-contact 274 is open, we prevent the immediate progression of the field-controller FC, all the way to its full-field position FF, when a braking-operation is called for, as indicated by the closure of the BR make-contact 273.

The start of the field-controller progression toward its full-field position is nevertheless permitted, in response to the closure of the make-contact 273 of the brake-relay BR, by means of a circuit from 46B to 33, through the field-controller segment 275, which is closed when the field-controller FC is at either its short-field position SF, or in the next adjacent position F4. In this manner, we permit the field-controlling means to begin to progress toward the full-field condition, but (assuming that the car is operating at a predeterminedly high speed) this progression toward full-field is interrupted before the full-field circuit-connections have been made, this interruption being achieved by the riding-off or opening of the field-controller contact 275, and by reason of the fact that the time-delaying back-contact 274 is open.

Once the time-delay relay TD has responded or operated, its holding-circuit 113—305—112 keeps it operated until the field-controller progression has been interrupted by the segment 275, at which time another field-controller segment 297 also opens and deenergizes the conductor 113 to which the time-delay holding-circuit is connected. The time-delay relay TD then commences to drop out, and because of its lag-coil or slug 301, its dropout-movement requires a certain predetermined time, say something like ½ to one second, or whatever may be required, so as to make the progression toward a full-field condition slower than it was before the introduction of our time-delay.

At the end of the dropout-time of the time-delay relay TD, the back-contact 274 of this relay closes, and permits the field-controller progression to proceed in the normal manner.

Other features of our invention are contingent upon the fact that traction-motor control-systems, of the type to which our invention relates, have for a long time been provided with a line-relay LR, which has a make-contact 206 which drops out in response to a power-line voltage-failure, either because of passing over a third-rail gap, or because of a trolley-voltage failure. When there is a failure of the line-voltage, this line-relay contact 206 opens, thereby deenergizing the line-switch LS1, which in turn opens its various make-contacts, thereby deenergizing all of the acceleration-progression switches, and causing the traction-motors to return to their initial deenergized condition. Then, when power-line voltage is again restored, the acceleration-progression has to proceed automatically again, (assuming that the master-controller has meanwhile been left in its on-position).

Three novel features of our invention are related to this well-known and necessary provision of a line-relay contact 206 which causes a reprogression of the acceleration-progression after a temporary power-outage while the master-controller is in an advanced on-position.

First, we have provided means for holding the field-controller in its short-field position SF, in case a brief power-outage should occur after the car or train has achieved a predeterminedly high speed, such as 42 miles per hour, or higher. Ordinarily, in traction-motor control-systems as previously used, and in our own control-system at operating-speeds below the aforesaid predeterminedly high speed, the restoration of power, after a brief outage such as is caused by passing over a third-rail gap, will cause the acceleration-progression to start all over again, as has just been described. During a normal accelerating-procedure, when the car or train is first being brought up to speed, it is necessary to make sure that the field-controller is in its full-field position FF at the time when the traction-motors are operating in their series connection, and to this end, the series-connection switch JR has a make-contact 221 which makes a connection from the control-circuit 67 to the full-field wire 33 of the field-controller FC. In accordance with one feature of our present invention, we provide a time-delay relay-contact 223 in series with this JR contact 221, so that the energization of the full-field wire 33 is permitted only when the car or train has not reached a speed high enough to energize the time-delay relay TD.

In our present invention, we have thus, for the first time, made provision for the fact that it is not necessary to cause the field-controller to progress backwards, from its short-field position to its full-field position, when the series-connection switch JR closes during a reprogression through the accelerating cycle after a brief power-outage, provided that the car or train is operating at a reasonably high speed at that time. Thus, when we have once obtained a high-speed response, which is registered by an energization of the time-delay relay TD, we use the back-contact 223 on this relay for operating in series with the series-connection switch-interlock 221 to prevent a backward progression of the field-controller to its full-field position when the motor-connections are reprogressing through their series-connection operating-conditions. Thus, we prevent an altogether unnecessary progression, back and forth, of the field-controller, in passing through the series connection of the motors, when the motor-speed is so high that a short-field condition is quite permissible in progressing through the series-connection stages of the acceleration-cycle.

A second provision of our invention, which is related to the reprogression of the acceleration-cycle which occurs after a brief power-outage, is related to our use of a re-calibrated condition of the limit-relay CR as a particular means for conveniently obtaining an overspeed response.

If, now, a reprogression-process occurs, as a result of a brief power-outage at a time when the car or train has not reached its predeterminedly high speed of say 42 miles per hour, it is necessary to make sure that an unwanted low-current response of the limit-relay does not occur at the instant when the accelerating-progression is completed, including a reprogression of the field-controller FC, and before the motor-flux has had a chance to stabilize itself at its final steady-state condition. Thus, assuming that the car is operating at a speed higher than the 18 miles per hour, which is assumed to be the normal speed at which the accelerating-cycle completes itself during the initial acceleration of the motors, and assuming that the speed is not as high as the predetermined speed which we have suggested as being 42 miles per hour, then we want to make sure that the limit-relay back-contact 199 is open at the moment when the field-controller FC finishes its reprogression from its full-field position to its short-field position, because, if the recalibrated limit-relay CR were deenergized at this instant, its back-contact 199 would pick up our time-delay relay TD as soon as the short-field segment 302 was closed, on the field-controller FC, during this reprogression cycle.

There is a danger that this limit-relay back-contact 199 might be closed, under the conditions just stated, even though the car-speed is not high enough to normally cause the limit-relay CR to drop out and close said back-contact 199, because the reprogression-process occurs at a high rate of speed, and the motor-fluxes, as has frequently been mentioned hereinabove, approach their final or steady-state values, after a change, at a rather slow rate, so that a minimum-current dropout-value for the recalibrated limit-relay CR, which is chosen with respect to the operating-conditions when the car-speed slowly rises from 18 to 42 miles per hour, after a normal period of acceleration, is no longer a reliable speed-indicating value in the event of a rapid reprogression of the motor-connections after a brief power-outage, when the motor is operating at some intermediate speed between the previously mentioned values of 18 and 42 miles per hour.

In order to provide a means for preventing an unwanted false high-speed indication, or dropout-response, of the limit-relay CR at the completion of the reprogression of the accelerating steps, after a brief power-outage, we have provided a means for strongly energizing the rate-coil RC of our limit-relay CR, while the field-controller is at some intermediate point in its progression from its full-field position FF to its short-field position SF.

It should be understood that, when a reprogression-cycle occurs after a brief power-outage, in the illustrated form of embodiment of our invention, in which the high-speed-responsive device is a recalibrated condition of the limit-relay CR, it is necessary or desirable to permit the field-controller to progress back to or toward its full-field position FF, and thus open its contact-segment 302, when the series motor-connections are made by the series-connection switch JR, unless some other equivalent means are provided for preventing our time-delay relay TD from being energized in response to the low-motor-currents which prevail when the progression of the accelerating-cycle is started all over again with the motor operating at a full speed. Thus, if this reprogression occurs at a time when the car-speed has not reached the critically high value, and when our time-delay relay TD is accordingly unexcited, our time-delay back-contact 223 permits the JR series-connection switch-interlock 221 to energize the full-field wire 33 of the field controller, long enough at least to move the field-controller FC off of its short-field position SF at which the controller-segment 302 would cause an unwanted energization of the time-delay relay TD in response to a low-current dropout-response of the limit-relay CR.

The particular means which we have shown, for accomplishing the purposes just discussed, involve the field-controller segment 300, which makes contact at one or more intermediate positions of the field-controller FC, and which thereupon gives the rate-coil RC a strong momentary energization or flux-increment, which is sufficiently large so that, by the time that the rapidly progressing field-controller reaches its short-field position SF, the limit-relay CR will not have had the small fraction of a second's time which is necessary to enable it to drop out ahead of the attainment of the short-field position by the field-controller FC.

It is desirable, though perhaps not obligatory, that this special field-controller segment 300 should make a closed contact only at some one or more transient positions of the field-controller FC, at a time or times when the field-controller is passing over from one of its intermediate field-positions, such as F1, to the next position, such as F2, for example. In this way, we avoid having this special segment 300 cause any interference in the normal progression of the field-controller during the initial acceleration of the car or train, particularly in those control-systems in which the field-controller progression is under the control of the limit-relay CR, which is sometimes the case. Also, the transient position response of the special field-controller contact-segment 300 is desirable in order to provide against the contingency of mechanical faults in the field-controller mechanism, particularly in a type of field-controller which is so mechanically constructed that, in the event of failure, it will not stop at some transient point halfway between two of its field-positions, such as F1 and F2, for example. By way of illustration, therefore, we have indicated this special field-controller contact-segment 300 as making a contact at each of the positions F1-½, F2-½ and F3-½ of the field-controller FC.

A third feature of our invention, which is related to the recycling progression, after the occurrence of a power-outage as indicated by the line-relay LR, has to do with the availability of dynamic-breaking power, during a power-outage, particularly in control-systems in which the previously known brake-power protective-relay BP has been used. The principal purposes of this protective-relay BP are to capture the motor-flux before it dies down to residual-flux value when the power is shut off, and to avoid difficulties due to a possible reversal of the residual magnetism in one or more of the traction-motors, in the event that a dynamic-braking circuit does not immediately follow a power-circuit energization of the motors. To these ends, there must be a power-application to the motors before the protective relay BP is initially energized, and this protective relay would not normally hold itself energized, as previously designed and controlled, if the power-source should fail while the master-controller is "on," unless the master-controller MC is immediately moved to its off-position.

If, therefore, a power-outage should occur while the car or train is in motion, and while the master-controller MC is in one of its on-positions, the brake-protective relay BP, as previously designed and controlled, would become deenergized, so that it could not be picked up again until power again became available and until the master-controller had been momentarily moved again to an on-position after the power had returned. It is sometimes necessary, however, for the motorman to have to stop his car or train during a power-outage condition, and it is quite desirable for him to be able to use dynamic braking for this purpose, instead of having to relay upon an emergency airbrake-application (not shown).

In order that dynamic braking may be successfully used, it has long been known to be necessary to set up a light-current dynamic-braking circuit or circuits during the coasting-period (long or short) which occurs between a power-circuit condition and a dynamic-braking operation. This coasting-period braking-circuit is necessary in order to capture the motor-flux before it dies down after the opening of the power-supplying switches, or after any other power-loss to the motors. This captured motor-flux is then held, by the "coasting" dynamic-braking circuit; and thereby two purposes are accomplished: first, the motor-flux is maintained at a certain intermediate level which enormously reduces the otherwise extremely long time which is required by series generators to build up their flux from a residual value to a full generating value, because of the well-known sluggish flux-responsive characteristics of series generators; and second, it prevents the possibility of a reversal of the residual flux of one or more of the motors, which would cause motor-burnouts and other serious damage in case a dynamic-braking operation were undertaken under such reversed-flux conditions.

In accordance with our prevent invention, therefore, we for the first time make available a means for immediately establishing a "coasting" dynamic-braking circuit-connection in response to a power-outage, even when the master-controller is in an on-position. Our means to this end is a special back-contact 209 on the line-relay LR, so that, if the line-relay should drop out, in response to a power-failure, while the master-controller MC is on any on-position, a circuit will be established from the train-line wire 12' to the control-circuit wire 10, and thence, through the aforesaid LR back-contact 209, the conductor 120, and a special BP make-contact 259, to the brake-circuit control-line 3. This brake-circuit control-line 3 thereupon not only energizes the BP hold-coil in time to catch the BP relay, before it drops out, but also (contingent upon the closure of the LS1 back-contact 260), energizes the brake-circuit control-wires 31B, 31C, 32, and 33, which set up the light-current dynamic-braking coasting-circuits, under the control of the spotting-relay SR.

While we have described our invention, and explained its manner of operation, in connection with a particular simplified illustrative form of embodiment, we wish it to be understood that the efficacy of the invention is not affected by the addition of desired additional features or safeguards, or by the omission of undesired or unnecessary features, or by the substitution of equivalent or alternative forms of various means or elements for performing the essential element-functions which have been described and explained.

We claim as our invention:

1. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a braking-switch means, for establishing a dynamic-braking circuit which uses said series-motor means as an entirely self-excited series-generator means, said dynamic-braking circuit including a controllable braking-circuit resistance; (d) a variable field-controlling means, for progressively adjusting said series field winding toward a full-field condition and toward a short-field condition, respectively; (e) an accelerating control-means, for controlling the closure of said power-switch means and, contingent upon such closure, controlling the acceleration of said series-motor means during power-circuit operating-conditions, said accelerating control-means including a means for causing said field-controlling means to progressively adjust said series field winding toward its short-field condition; (f) a means for operating, and holding operated, a high-speed-responsive control-circuit contact, in response to the attainment of a predeterminedly high motor-speed during short-field power-circuit operating-conditions; (g) a spotting-current control-means, operating to close said braking-switch means in response to an opening of said power-switch means, said spotting-current control-means including a means for causing said field-controlling means to progressively adjust said series field winding toward its full-field condition at motor-speeds which are slow enough to necessitate such spotting-adjustment; and (h) a dynamic-braking control-means, operative to convert said spotting-current conditions into dynamic-braking conditions, said dynamic-braking control-means including: a means responsive alternatively to either a low-speed position of said high-speed-responsive control-circuit contact, or a near-short-field condition of said field-controlling means, for causing said field-controlling means to adjust said series field winding toward a fuller field; a delaying means, operative during dynamic-braking conditions, and responsive to an adjustment of said field-controlling means to a predetermined field-controlling condition which is less short than said near-short-field condition, for causing said high-speed-responsive control-circuit contact to return from its high-speed position to its low-speed position, but only after a delay sufficient for a partial buildup of the braking-current at said predetermined field-controlling condition; and a means, operative after full-field conditions have been established during dynamic-braking conditions, for progressively reducing the value of the resistance in the braking-circuit.

2. The invention as defined in claim 1, characterized by the delaying means of said dynamic-braking control-means (h) being a time-delay means, responsive to a field-controlling condition which is less short than said near-short-field condition, for causing said high-speed-responsive control-circuit contact to return from its high-speed position to its low-speed position, but only after a predetermined time-delay.

3. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a braking-switch means, for establishing a dynamic-braking circuit which uses said series-motor means as an entirely self-excited series-generator means, said dynamic-braking circuit including a controllable braking-circuit resistance; (d) a variable field-controlling means, for progressively adjusting said series field winding toward a full-field condition and toward a short-field condition, respectively; (e) an accelerating control-means, for controlling the closure of said power-switch means and, contingent upon such closure, controlling the acceleration of said series-motor means during power-circuit operating-conditions, said accelerating control-means comprising: an acceleration-controlling limit-relay means which is energized to be responsive to conditions which accompany a lower-than-desired motor-current during acceleration; a first-adjustment motor-control means, responsive whenever a low-current condition exists in said acceleration-controlling limit-relay means, for progressively increasing the effective armature-voltage applied to said series-motor means; and a final-adjustment motor-control means, operative after maximum armature-voltage conditions have been established, for causing said field-controlling means to progressively adjust said series field winding toward its short-field condition; (f) a means for opening, and holding open, a high-speed-responsive control-circuit contact, in response to the attainment of a predeterminedly high motor-speed during short-field power-circuit operating-conditions; (g) a spotting-current control-means, operating to close said braking-switch means in response to an opening of said power-switch means, said spotting-current control-means including a means for causing said field-controlling means to progressively adjust said series field winding toward its full-field condition at motor-speeds which are slow enough to necessitate such spotting-adjustments; and (h) a dynamic-braking control-means, operative to convert said spotting-current conditions into dynamic-braking conditions, said dynamic-braking control-means including: a means responsive alternatively to either a closed position of said high-speed-responsive control-circuit contact, or near-short-field condition of said field-controlling means, for causing said field-controlling means to adjust said series field winding toward a fuller field; a delaying means, operative during dynamic-braking conditions, and responsive to an adjustment of said field-controlling means to a predetermined field-controlling condition which is less short than said near-short-field condition, for reclosing said high-speed-responsive control-circuit contact, but only after a delay sufficient for a partial buildup of the braking-current at said predetermined field-controlling condition; and a means, operative after full-field conditions have been established during dynamic-braking conditions, for progressively reducing the value of the resistance in the braking-circuit.

4. The invention as defined in claim 3, characterized by the delaying means of said dynamic-braking control-means (h) being a time-delay means, responsive to a field-controlling condition which is less short than said near-short-field condition, for reclosing said high-speed-responsive control-circuit contact, but only after a predetermined time-delay.

5. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a braking-switch means, for establishing a dynamic-braking circuit which uses said series-motor means as an entirely self-excited series-generator means, said dynamic-braking circuit including a controllable braking-circuit resistance; (d) a variable field-controlling means, for progressively adjusting said series field winding toward a full-field condition and toward a short-field condition, respectively; (e) an accelerating control-means, for controlling the closure of said power-switch means and, contingent upon such closure, controlling the acceleration of said series-motor means during power-circuit operating-conditions, said accelerating control-means comprising: an acceleration-controlling limit-relay means which is energized to be responsive to conditions which accompany a lower-than-desired motor-current during acceleration; a first-adjustment motor-control means, responsive whenever a low-current condition exists in said acceleration-controlling limit-relay means, for progressively increasing the effective armature-voltage applied to said series-motor means; and a final-adjustment motor-control means, operative after maximum armature-voltage conditions have been established, for causing said field-controlling means to progressively adjust said series field winding toward its short-field condition; (f) a recalibrating means, operative in response to the short-field condition of said field-controlling means, for thereupon recalibrating said acceleration-controlling limit-relay means so that it will thereafter respond only to low-current conditions corresponding to the attainment of a predeterminedly high motor-speed; (g) a means for operating, and holding operated, a high-speed-responsive control-circuit contact, in response to a low-current condition of the acceleration-controlling limit-relay means, during short-field power-circuit operating-conditions; (h) a spotting-current control means, operating to close said braking-switch means in response to an opening of said power-switch means, said spotting-current control-means including a means for causing said field-controlling means to progressively adjust said series field winding toward its full-field condition at motor-speeds which are slow enough to necessitate such spotting-adjustment; and (*i*) a dynamic-braking control-means, operative to convert said spotting-current conditions into dynamic-braking conditions, said dynamic-braking control-means including: a means responsive alternatively to either a low-speed position of said high-speed-responsive control-circuit contact, or a near-short-field condition of said field-controlling means, for causing said field-controlling means to adjust said series field winding toward a fuller field; a delaying means, operative during dynamic-braking conditions, and responsive to an adjustment of said field-controlling means to a predetermined field-controlling condition which is less short than said near-short-field condition, for causing said high-speed-responsive control-circuit contact to return from its high-speed position to its low-speed position, but only after a delay sufficient for a partial buildup of the braking-current at said predetermined field-controlling condition; and a means, operative after full-field conditions have been established during dynamic-braking conditions, for progressively reducing the value of the resistance in the braking-circuit.

6. The invention as defined in claim 5, characterized by the delaying means of said dynamic-braking control-means (*i*) being a time-delay means, responsive to a field-controlling condition which is less short than said near-short-field condition, for causing said high-speed-responsive control-circuit contact to return from its high-speed position to its low-speed position, but only after a predetermined time-delay.

7. The invention as defined in claim 5, characterized by said variable field-controlling means (*d*) having an auxiliary control-circuit contact-making means, which is operated at some intermediate time during the progression of the field-controlling means from its full-field condition to its short-field condition; and a means, responsive to said auxiliary control-circuit contact, for giving the acceleration-controlling limit-relay means a boost in excitation sufficient to insure against a low-current response.

8. The invention as defined in claim 7, characterized by the delaying means of said dynamic-braking control-means (*i*) being a time-delay means, responsive to a field-controlling condition which is less short than said near-short-field condition, for causing said high-speed-responsive control-circuit contact to return from its high-speed position to its low-speed position, but only after a predetermined time-delay.

9. The invention as defined in claim 5, in combination with: a voltage-responsive line-relay for opening the power-switch means, in response to a failure of the supply-circuit voltage; and a second recalibrating means, operative only at some intermediate time during the progression of the field-controlling means from its full-field condition to its short-field condition, for additionally recalibrating the acceleration-controlling limit-relay means in an amount and manner sufficient to insure that the acceleration-controlling limit-relay means will not be in a low-current response-condition when the field-controlling means reaches its short-field condition during a reprogression of the accelerating control-means caused by a supply-circuit voltage-failure while said accelerating control-means is in position for operation.

10. The invention as defined in claim 9, characterized by the delaying means of said dynamic-braking control-means (*i*) being a time-delay means, responsive to a field-controlling condition which is less short than said near-short-field condition, for causing said high-speed-responsive control-circuit contact to return from its high-speed position to its low-speed position, but only after a predetermined time-delay.

11. A motor-controlling assembly, including the combination, with a series-motor means to be controlled, said series-motor means including a motor-armature and a series field winding connected in series therewith, of: (*a*) a supply-circuit for the series-motor means; (*b*) a power-switch means, for establishing a power-circuit for energizing the series-motor means from the supply-circuit; (*c*) a braking-switch means, for establishing a dynamic-braking circuit which uses said series-motor means as an entirely self-excited series-generator means, said dynamic-braking circuit including a controllable braking-circuit resistance; (*d*) a variable field-controlling means, for progressively adjusting said series field winding toward a full-field condition and toward a short-field condition, respectively; (*e*) an accelerating control-means, for controlling the closure of said power-switch means and, contingent upon such closure, controlling the acceleration of said series-motor means during power-circuit operating-conditions, said accelerating control-means comprising: an acceleration-controlling limit-relay means which is energized to be responsive to conditions which accompany a lower-than-desired motor-current during acceleration; a first-adjustment motor-control means, responsive whenever a low-current condition exists in said acceleration-controlling limit-relay means, for progressively increasing the effective armature-voltage applied to said series-motor means; and a final-adjustment motor-control means, operative after maximum armature-voltage conditions have been established, for causing said field-controlling means to progressively adjust said series field winding toward its short-field condition; (*f*) a means for operating, and holding operated, a high-speed-responsive control-circuit contact, in response to the attainment of a predeterminedly high motor-speed during short-field power-circuit operating-conditions; (*g*) a spotting-current control-means, operating to close said braking-switch means in response to an opening of said power-switch means, said spotting-current control-means including: a spotting-controlling limit-relay means which is energized to be responsive to conditions which accompany a lower-than-desired spotting-current in the dynamic-braking circuit; and a means responsive whenever a low-current condition exists in said spotting-controlling limit-relay means, for causing said field-controlling means to progressively adjust said series field winding toward its full-field condition; and (*h*) a dynamic-braking control-means, operative to convert said spotting-current conditions into dynamic-braking conditions, said dynamic-braking control-means including: a braking-controlling limit-relay means which is energized to be responsive to conditions which accompany a lower-than-desired braking-current in the dynamic-braking circuit; a field-strengthening braking-controlling means, responsive whenever a low-current condition exists in said braking-controlling limit-relay means, and further responsive alternatively to either a low-speed position of said high-speed-responsive control-circuit contact, or a near-short-field condition of said field-controlling means, for causing said field-controlling means to adjust said series field winding toward a fuller field; a delaying means, operative during dynamic-braking conditions, and responsive to an adjustment of said field-controlling means to a predetermined field-controlling condition which is less short than said near-short-field condition, for causing said high-speed-responsive control-circuit contact to return from its high-speed position to its low-speed position, but only after a delay sufficient for a partial buildup of the braking-current at said predetermined field-controlling condition; and a means, operative after full-field conditions have been established during dynamic-braking conditions, for progressively reducing the value of the resistance in the braking-circuit, under the control of said braking-controlling limit-relay means.

12. The invention as defined in claim 11, characterized by the delaying means of said dynamic-braking control-means (*h*) being a time-delay means, responsive to a field-controlling condition which is less short than said near-short-field condition, for causing said high-speed-responsive control-circuit contact to return from its high-speed position to its low-speed position, but only after a predetermined time-delay.

13. The invention as defined in claim 11, characterized by said spotting-current control-means (*g*) additionally including a means responsive whenever an acceptable-current condition exsists in said spotting-controlling limit-relay means, for causing said field-controlling means to adjust said series field winding toward its short-field condition.

14. The invention as defined in claim 13, characterized by the delaying means of said dynamic-braking control-means (*h*) being a time-delay means, responsive to a field-controlling condition which is less short than said near-short-field condition, for causing said high-speed responsive control-circuit contact to return from its high-speed position to its low-speed position, but only after a predetermined time-delay.

15. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a braking-switch means, for establishing a dynamic-braking circuit for the series-motor means; (d) a variable field-controlling means, for progressively adjusting said series field winding toward a full-field condition and toward a short-field condition, respectively; (e) a progressively operating acceleration-controlling means, for controlling the acceleration of the series-motor means during power-circuit operating-conditions, said acceleration-controlling means including a finally-operating means for causing said field-controlling means to progressively adjust said series field winding toward its short-field condition; (f) a progressively operating spotting-controlling means, for controlling the spotting-adjustment of the dynamic-braking circuit during coasting conditions, said spotting-controlling means including a means for causing said field-controlling means to progressively adjust said series field winding toward its full-field condition; (g) a progressively operating braking-controlling means, for controlling the braking-adjustment of the dynamic-braking circuit during dynamic-braking conditions, said braking-controlling means including a first-operating means for causing said field-controlling means to adjust said series field winding to its full-field condition; (h) an accelerating-controller, having an off-position and an on-position or positions; (i) a braking-controller, having an off-position and an on-position or positions; (j) a starting-circuit means, for closing the power-switch means, in response to an on-position of the accelerating-controller; (k) an accelerating-circuit means, responsive to a closed condition of the power-switch means, and an on-position or positions of the accelerating-controller, for causing a progressing operation of the progressively operating acceleration-controlling means; (l) a means for operating, and holding operated, a high-speed-responsive control-circuit contact, in response to the attainment of a predeterminedly high motor-speed during short-field power-circuit operating-conditions; (m) a spotting-circuit means, responsive to an off-position of the accelerating-controller and an off-position of the braking-controller, for closing the braking-switch means and causing a progressing operation of the spotting-controlling means; and (n) a braking-circuit means, responsive to an off-position of the accelerating-controller and an on-position or positions of the braking-controller, and further responsive alternatively to either a low-speed position of said high-speed-responsive control-circuit contact, or a near-short-field condition of said field-controlling means, for causing said field-controlling means to adjust said series field winding toward a fuller field; a delaying means, operative during dynamic-braking conditions, and responsie to an adjustment of said field-controlling means to a predetermined field-controlling condition which is less short than said near-short-field condition, for causing said high-speed-responsive control-circuit contact to return from its high-speed position to its low-speed position, but only after a delay sufficient for a partial build-up of the braking-current at said predetermined field-controlling condition; and a means, operative after full-field conditions have been established during dynamic-braking conditions, for causing a continuing progressive operation of the progressively operating braking-controlling means.

16. The invention as defined in claim 15, characterized by the delaying means of said braking-circuit means (n) being a time-delay means, responsive to a field-controlling condition which is less short than said near-short-field condition, for causing said high-speed-responsive control-circuit contact to return from its high-speed position to its low-speed position, but only after a predetermined time-delay.

17. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a braking-switch means, for establishing a dynamic-braking circuit for the series-motor means; (d) a variable field-controlling means, for progressively adjusting said series field winding toward a full-field condition and toward a short-field condition, respectively; (e) a progressively operating acceleration-controlling means, for controlling the acceleration of the series-motor means during power-circuit operating-conditions, said acceleration-controlling means including a finally-operating means for causing said field-controlling means to progressively adjust said series field winding toward its short-field condition; (f) a progressively operating spotting-controlling means, for controlling the spotting-adjustment of the dynamic-braking circuit during coasting conditions, said spotting-controlling means including a means for causing said field-controlling means to progressively adjust said series field winding toward its full-field condition; (g) a progressively operating braking-controlling means, for controlling the braking-adjustment of the dynamic-braking circuit during dynamic-braking conditions, said braking-controlling means including a first-operating means for causing said field-controlling means to adjust said series field winding to its full-field condition; (h) an accelerating-controller, having an off-position and an on-position or positions; (i) a braking-controller, having an off-position and an on-position or positions; (j) a voltage-responsive line-relay, for making a no-voltage response to a failure of the supply-circuit voltage; (k) a protective relay; (l) a control-circuit means, for effecting an actuation of said protective relay, in response to a closure of the power-switch means; (m) a holding-means, for holding said protective relay in its actuated condition, in alternative response to either a no-voltage position of said line-relay or an off-position of said accelerating-controller, said holding-means being effective only after said protective relay has been previously actuated to its actuated condition; (n) a starting-circuit means, for closing the power-switch means, but only when the accelerating-controller is in an on-position and when, at the same time, the line-relay is in a full-voltage position, and for opening said power-switch means when either one of these conditions does not prevail; (o) an accelerating-circuit means, responsive to a closed condition of the power-switch means, and an on-position or positions of the accelerating-controller, for causing a progressing operation of the progressively operating acceleration-controlling means; (p) a means for operating, and holding operated, a high-speed-responsive control-circuit contact, in response to the attainment of a predeterminedly high motor-speed during short-field power-circuit operating-conditions; (q) a spotting-circuit means, responsive to an off-position of the accelerating-controller, an off-position of the braking-controller, and an actuated condition of said protective relay, for closing the braking-switch means and causing an operation of the spotting-controlling means; and (r) a braking-circuit means, responsive to an off-position of the accelerating-controller, an on-position or positions of the braking-controller, and an actuated condition of said protective relay, and further responsive alternatively to either a low-speed position of said high-speed-responsive control-circuit contact, or a near-short-field condition of said field-controlling means, for causing said field-controlling means to adjust said series field winding toward a fuller field, a delay-means, operative during dynamic-braking conditions, and responsive to an adjustment of said field-controlling means to a predetermined field-controlling condition which is less short than said near-short-field condition, for causing said high-speed-responsive control-circuit contact to return from its high-speed position to its low-speed position, but only after a delay sufficient for a partial build-up of the braking-current at said predetermined field-controlling condition; and a means, operative after full-field conditions have been established during dynamic-braking conditions, for causing a continuing progressive operation of the progressively operating braking-controlling means.

18. The invention as defined in claim 17, characterized by said accelerating-circuit means (o) being also responsive to an actuated condition of said protective relay.

19. A motor-controlling assembly, including the combination, with a motor-means to be controlled, of: (a) a supply-circuit for the motor-means; (b) a power-switch means, for establishing a power-circuit for energizing the motor-means from the supply-circuit; (c) a braking-switch means, for establishing a dynamic-braking circuit for the motor-means; (d) a progressively operating acceleration-controlling means, for controlling the acceleration of the motor-means during power-circuit operating- conditions; (e) a spotting-controlling means, for controlling the spotting-adjustment of the dynamic-braking circuit during coasting conditions; (f) a progressively operating braking-controlling means, for controlling the braking-adjustment of the dynamic-braking circuit during dynamic-braking conditions; (g) an accelerating-controller, having an off-position and an on-position or positions; (h) a braking-controller, having an off-position and an on-position or positions; (i) a voltage-responsive line-relay, for making a no-voltage response to a failure of the supply-circuit voltage; (j) a protective relay; (k) a control-circuit means, for effecting an actuation of said protective relay, in response to a closure of the power-switch means; (l) a holding-means, for holding said protective relay in its actuated condition, in alternative response to either a no-voltage position of said line-relay or an off-position of said accelerating-controller, said holding-means being effective only after said protective relay has been previously actuated to its actuated condition; (m) a starting-circuit means, for closing the power-switch means, but only when the accelerating-controller is in an on-position and when, at the same time, the line-relay is in a full-voltage position, and for opening said power-switch means when either one of these conditions does not prevail; (n) an accelerating-circuit means, responsive to a closed condition of the power-switch means, and an on-position or positions of the accelerating-controller, for causing a progressing operation of the progressively operating acceleration-controlling means; (o) a spotting-circuit means, responsive to an off-position of the accelerating-controller, an off-position of the braking- controller, and an actuated condition of said protective relay, for closing the braking-switch means and causing an operation of the spotting-controlling means; and (p) a braking-circuit means, responsive to an off-position of the accelerating-controller, an on-position or positions of the braking-controller, and an actuated condition of said protective relay, for closing the braking-switch means and causing a progressing operation of the progressively operating braking-controlling means.

20. The invention as defined in claim 19, characterized by said accelerating-circuit means (n) being also responsive to an actuated condition of said protective relay.

21. A railway-motor control-assembly, including the combination; with two series-motor means, each series-motor means including a motor-armature and a series field winding connected in series therewith, of: (a) a supply-circuit for the series-motor means; (b) a power-switch means, for establishing a power-circuit for energizing the series-motor means from the supply-circuit; (c) a voltage-responsive line-relay, for insuring an opening of said power-switch means in response to a failure of the supply-circuit voltage; (d) a series-connection switching-means, for connecting the two series-motor means in series with each other; (e) a parallel-connection switching-means, for connecting the two series-motor means in parallel with each other; (f) a field-controlling means, for adjusting said series field windings toward a full-field condition and toward a short-field condition, respectively; (g) a speed-responsive means, responsive to the attainment of a predeterminedly high motor-speed; (h) a field-strengthening control-circuit means, for causing said field-controlling means to adjust said series field windings toward a full-field condition, in response to a closure of said series-connection switching-means and a non-responsive condition of said speed-responsive means; and (i) an accelerating control-means, for controlling the closure of said power-switch means and, contingent upon such closure, controlling the acceleration of said series-motor means during power-circuit operating-conditions, said accelerating control-means comprising: a first-operating means, for closing said series-connection switching-means; a second-operating means, for closing said parallel-connection switching-means; and a last-operating means, for causing said field-controlling means to adjust said series field windings toward a short-field condition.

22. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a voltage-responsive line-relay, for insuring an opening of said power-switch means in response to a failure of the supply-circuit voltage; (d) a braking-switch means, for establishing a dynamic-braking circuit; (e) an accelerating control-means, for controlling the closure of said power-switch means and, contingent upon such closure, controlling the acceleration of said series-motor means during power-circuit operating-conditions; (f) a spotting-current control-means, for closing said braking-switch means, in alternative response to either an off-position of said accelerating control-means or a voltage-failure response of said line-relay; and (g) a dynamic-braking control-means, operative to convert said spotting-current conditions into dynamic-braking conditions.

23. A motor-controlling assembly, including the combination, with a series-motor means to be controlled, said series-motor means including a motor-armature and a series field winding connected in series therewith, of: (a) a supply-circuit for the series-motor means; (b) a power-switch means, for establishing a power-circuit for energizing the series-motor means from the supply-circuit; (c) a voltage-responsive line-relay, for insuring an opening of said power-switch means in response to a failure of the supply-circuit voltage; (d) a braking-switch means, for establishing a dynamic-braking circuit; (e) an accelerating control-means, for controlling the closure of said power-switch means and, contingent upon such closure, controlling the acceleration of said series-motor means during power-circuit operating-conditions; (f) a protective relay; (g) a control-circuit means, for effecting an actuation of said protective relay, in response to a closure of the power-switch means; (h) a holding-means, for holding said protective relay in its actuated condition, once it has been previously actuated to its actuated condition, said holding-means including a holding-circuit conductor whereby said holding-means is energized; (i) a holding-circuit energizing-means for energizing said holding-circuit conductor, in alternative response to either an off-position of said accelerating control-means for a voltage-failure response of said line-relay; (j) a spotting-current control-means, for closing said braking-switch means, in joint response to an energization of said holding-circuit conductor and an actuated condition of said protective relay; and (k) a dynamic-braking control-means, operative to convert said spotting-current conditions into dynamic-braking conditions.

24. The invention as defined in claim 23, characterized by said accelerating control-means (e) being also responsive to an actuated condition of said protective relay.

References Cited in the file of this patent

UNITED STATES PATENTS

| Number | Name | Date |
| --- | --- | --- |
| 2,078,649 | Willby | Apr. 27, 1937 |
| 2,078,684 | Riley | Apr. 27, 1937 |
| 2,274,645 | Austin | Mar. 3, 1942 |
| 2,331,228 | Purifoy | Oct. 5, 1943 |
| 2,523,143 | Riley et at. | Sept. 19, 1950 |